US 8,880,019 B1

(12) United States Patent
Daly et al.

(10) Patent No.: US 8,880,019 B1
(45) Date of Patent: Nov. 4, 2014

(54) EMERGENCY ALERT SYSTEM (EAS) MESSAGE SERVICE PROFILE

(75) Inventors: Brian Kevin Daly, Seattle, WA (US); DeWayne Allan Sennett, Redmond, WA (US)

(73) Assignee: AT&T Mobility II LLC, Atlanta, GA (US)

(*) Notice: Subject to any disclaimer, the term of this patent is extended or adjusted under 35 U.S.C. 154(b) by 1826 days.

(21) Appl. No.: 11/836,473

(22) Filed: Aug. 9, 2007

Related U.S. Application Data

(60) Provisional application No. 60/889,425, filed on Feb. 12, 2007.

(51) Int. Cl.
*H04M 11/04* (2006.01)
*H04N 7/10* (2006.01)

(52) U.S. Cl.
USPC .......................................... 455/404.1; 725/33

(58) Field of Classification Search
CPC .............................. H04W 76/007; H04W 4/22
USPC ......................................... 455/404.1; 725/33
See application file for complete search history.

(56) References Cited

U.S. PATENT DOCUMENTS

| | | | |
|---|---|---|---|
| 6,112,075 A | 8/2000 | Weiser | 455/404 |
| 7,142,900 B1 * | 11/2006 | Straub | 455/701 |
| 7,483,519 B2 * | 1/2009 | Binning | 379/45 |
| 8,271,003 B1 * | 9/2012 | Othmer et al. | 455/466 |
| 2002/0160745 A1 * | 10/2002 | Wang | 455/404 |
| 2002/0188744 A1 * | 12/2002 | Mani | 709/231 |
| 2003/0196200 A1 * | 10/2003 | Manson et al. | 725/33 |
| 2006/0015916 A1 * | 1/2006 | Yun | 725/108 |
| 2006/0040639 A1 | 2/2006 | Karl et al. | 455/404.1 |
| 2008/0201225 A1 * | 8/2008 | Maharajh et al. | 705/14 |

* cited by examiner

*Primary Examiner* — Christopher M Brandt
*Assistant Examiner* — Muthuswamy Manoharan
(74) *Attorney, Agent, or Firm* — Baker & Hostetler LLP

(57) ABSTRACT

The service profile of an emergency alert system (EAS) message provides an indication of the alert and technology attributes associate with the delivery of the emergency alert message. In an example configuration, the service profile comprises an alert profile and a technology profile. The alert profile contains information pertaining to alert attributes and alert attribute contents. The technology profile contains information pertaining to text attributes, audio attributes, in band video attributes, out of band video/multimode attribute, and/ or multimedia attributes.

18 Claims, 14 Drawing Sheets

18

| Alert Attributes ||||| 
|---|---|---|---|---|
| Attribute Name | Attribute Definition | Attribute Source | Usage by Wireless Operator Network | Usage by Mobile Device |
| Message ID | Unique message identifier across all possible EAS sources | EAS Gateway | Correlation with alert update or alert cancellation messages | Detection of duplicate alert messages Correlation with alert update or alert cancellation messages |
| Message Status | Can be based upon the converged application platform (CAP) Status attribute. Example values can include " Exercise," ' System," " Test," and " Draft.". | EAS Source via EAS Gateway | Determination of action to be performed on this message | Not sent to mobile device |
| Message Type | Type of alert message based upon the CAP MsgType attribute as follows: <br> - Alert <br> - Update <br> - Cancel <br> - ACK <br> - Error | EAS Source via EAS Gateway | Determination of action to be performed on this message and any associated previous message. | Determination of action to be performed on this message and any associated previous message. |
| Associated Message ID | Message ID of previous associated message alert for updates or cancellations | EAS Source via EAS Gateway | Correlation with alert update or alert cancellation messages with previously issued alert message. | Correlation with alert update or alert cancellation messages with previously issued alert message. |
| EAS Sender | Identification of the sender of the emergency alert message based upon the CAP Sender attribute | EAS Source via EAS Gateway | For logging of emergency alert message | Not sent to mobile device |

| Alert Attributes ||||| 
|---|---|---|---|---|
| Attribute Name | Attribute Definition | Attribute Source | Usage by Wireless Operator Network | Usage by Mobile Device |
| Alert Creation Timestamp | Timestamp of the creation of the emergency alert message based upon the CAP Sent attribute | EAS Source via EAS Gateway | For logging of emergency alert message | For presentation to mobile device |
| Alert Expiration Timestamp | Optional timestamp for the expiration of the emergency alert message based upon the CAP expires attribute NOTE: This is an optional CAP attribute and if not provided the recipient may define the expiration time. | EAS Source via EAS Gateway | Could be used to automatically discontinue the transmission of the associated emergency alert message. | Could be used to notify the subscriber that the emergency alert has expired. |
| Presidential Alert Indicator | Indication if emergency alert message is Presidential level alert message | EAS Source via EAS Gateway | Could be used for prioritizing and sequencing of emergency alert messages within the delivery technology selected by the wireless network operator. | Used to override all subscriber emergency alert opt- out selections |
| Wireless Alert Message Category | Indication of the associated wireless alert message category for subscriber opt out selections | EAS Gateway Mapping of Category attribute in CAP protocol to associated wireless alert message category is performed with the EAS Gateway | Passed thru to mobile device | Determination if emergency alert message is to be processed and/or presented to subscriber based upon the subscriber s opt- out selections |
| Alert Urgency | Urgency of the emergency alert based upon the Urgency attribute of the CAP protocol Example values include" Immediate" and" Expected" | EAS Source via EAS Gateway | Used for prioritizing and sequencing of emergency alert messages within the delivery technology selected by the wireless network operator. | Used for prioritizing and sequencing processing and presentation of emergency alert messages |

| Alert Attributes | | | | |
|---|---|---|---|---|
| Attribute Name | Attribute Definition | Attribute Source | Usage by Wireless Operator Network | Usage by Mobile Device |
| Alert Severity | Severity of the emergency alert based upon the Severity attribute of the CAP protocol Example values include" Extreme" and" Severe" | EAS Source via EAS Gateway | Used for prioritizing and sequencing of emergency alert messages within the delivery technology selected by the wireless network operator. | Used for prioritizing and sequencing processing and presentation of emergency alert messages |
| Alert Certainty | Certainty of the emergency alert based upon the Certainty attribute of the CAP protocol Only the" Observed' or" Likely" values supported | EAS Source via EAS Gateway | Used for prioritizing and sequencing of emergency alert messages within the delivery technology selected by the wireless network operator. | Used for prioritizing and sequencing processing and presentation of emergency alert messages |
| Alert Area | Alert area of the associated emergency alert as specified by FIPS code or NOAA SAME code EAS Gateway may need to convert the polygon alert are of the CAP protocol to the associated FIP or NOAA SAME code | EAS Gateway | Determination of delivery area for the emergency alert message based upon the delivery technology and preferences selected by the wireless network operator | Could be used for the processing and presentation of emergency alert messages. |
| Alert Info | Description of the emergency alert based upon the combination of the Headline, Description, and Instruction attributes of the CAP Protocol and which is formatted for delivery to a mobile device | EAS Source via EAS Gateway EAS Source and EAS Gateway must negotiate how to combine these CAP attributes into a single Alert Info attribute which would be compatible with mobile devices which support wireless emergency alerts. | Passed thru to mobile device Wireless operator network shall not manipulate the contents of this attribute in any manner. | For processing and presentation to the mobile device based upon subscriber's opt- out selection and alert preferences |
| Gateway to Wireless Network Security | Definition of security functions between EAS Gateway and wireless operator network to support the following:<br>- Data Integrity<br>- Non- Repudiation<br>- Authentication | Defined by the standardized interface between the EAS Gateway and the Wireless Network | Perform security functions between EAS Gateway and wireless network | Not Applicable |

| Alert Content Attributes ||||| 
|---|---|---|---|---|
| Attribute Name | Attribute Definition | Attribute Source | Usage by Wireless Operator Network | Usage by Mobile Device |
| Content Format | Defines the format of the emergency alert message content based upon one of the following technology profiles:<br>- Text<br>- Audio<br>- Video<br>- Multimedia | EAS Source via EAS Gateway | Passed thru to mobile device Wireless operator network shall not manipulate the contents of this attribute in any manner. | For processing and presentation to the mobile device based upon subscriber's opt-out selection and alert preferences |
| Content Language | Defines the language of the emergency alert message content Language and any associated character sets must be supported by the delivery technology selected by the wireless network operator | EAS Source via EAS Gateway | Passed thru to mobile device Wireless operator network shall not manipulate the contents of this attribute in any manner. | For processing and presentation to the mobile device based upon subscriber's opt-out selection and alert preferences |
| Alert Contents | Contents of the emergency alert message Size and format of emergency alert message content must be compatible with the capabilities of the delivery technology selected by the wireless network operator | EAS Source via EAS Gateway | Passed thru to mobile device Wireless operator network shall not manipulate the contents of this attribute in any manner. | For processing and presentation to the mobile device based upon subscriber's opt-out selection and alert preferences |

| | | | Text Attributes | |
|---|---|---|---|---|
| Attribute Name | Attribute Definition | Attribute Source | Usage by Wireless Operator Network | Usage by Mobile Device |
| Size | Maximum number of bytes, number of segments (e.g., pages) and length of each segment supported by the text delivery technology | Defined by the text delivery technology selected by the wireless network operator | Validation that the text emergency alert message content is within limitations of delivery technology | Validation that the text emergency alert message content is within limitations of mobile device |
| Delivery Technologies | Identification of the wireless network operator selected text delivery technology Available delivery technologies are - Cell Broadcast - MBMS - BCMCS - Paging | Defined by the wireless network operator | Delivery of text emergency alert message | Reception of text emergency alert message |
| Data Coding Scheme | Identification of the text data coding scheme for character sets and languages which are supported by the wireless operator selected text delivery technology E.g. for GSM Cell Broadcast, the character set and language are defined in 3GPP TS 23.038 | Defined by the text delivery technology selected by the wireless network operator | Passed thru to mobile device | Decoding of received text content for presentation to mobile device user. |
| Retransmission | Frequency of retransmission Retransmission parameters could including the following: - Time between retransmissions - Total number of retransmissions - Duration of retransmission interval | Defined by the wireless network operator based upon the selected text delivery technology | Perform text emergency alert message retransmissions via the wireless network operator selected text delivery technology | Attribute not delivered to mobile device |
| Wireless Network to Mobile Handset Security | Definition of security functions between wireless operator network and mobile device to support the following: - Data Integrity - Non-Repudiation - Authentication | Defined by the wireless network operator based upon the selected text delivery technology | Perform security functions between wireless network and mobile device for the wireless network operator selected text delivery technology | Perform security functions between wireless network and mobile device for the wireless network operator selected text delivery technology |

| Audio Attributes |||||
|---|---|---|---|---|
| Attribute Name | Attribute Definition | Attribute Source | Usage by Wireless Operator Network | Usage by Mobile Device |
| Size | Maximum number of bytes and/or maximum length in seconds supported by the audio delivery technology | Defined by the audio delivery technology selected by the wireless network operator | Validation that the audio emergency alert message content is within limitations of delivery technology | Validation that the audio emergency alert message content is within limitations of mobile device |
| Delivery Technologies | Identification of the wireless network operator selected audio delivery technology Available delivery technologies are - MBMS - BCMCS - DVB-H - MediaFLO - NOAA Weather Radio | Defined by the wireless network operator | Delivery of audio emergency alert message | Reception of audio emergency alert message |
| Data Coding Scheme | Identification of the audio modulation scheme or codecs supported by the wireless operator selected audio delivery technology | Defined by the audio delivery technology selected by the wireless network operator | Passed thru to mobile device | Decoding of received audio content for presentation to mobile device user. |
| Retransmission | Frequency of retransmission Retransmission parameters could including the following: - Time between retransmissions - Total number of retransmissions - Duration of retransmission interval | Defined by the wireless network operator based upon the selected audio delivery technology | Perform audio emergency alert message retransmissions via the wireless network operator selected audio delivery technology | Attribute not delivered to mobile device |
| Wireless Network to Mobile Handset Security | Definition of security functions between wireless operator network and mobile device to support the following: - Data Integrity - Non-Repudiation - Authentication | Defined by the wireless network operator based upon the selected audio delivery technology | Perform security functions between wireless network and mobile device for the wireless network operator selected audio delivery technology | Perform security functions between wireless network and mobile device for the wireless network operator selected audio delivery technology |

| | In Band Video Attributes | | | |
|---|---|---|---|---|
| Attribute Name | Attribute Definition | Attribute Source | Usage by Wireless Operator Network | Usage by Mobile Device |
| Size | Maximum number of bytes and/or maximum length in seconds supported by the in band video delivery technology | Defined by the in band video delivery technology selected by the wireless network operator | Validation that the in band video emergency alert message content is within limitations of delivery technology | Validation that the in band video emergency alert message content is within limitations of mobile device |
| Delivery Technologies | Identification of the wireless network operator selected in band video delivery technology Available delivery technologies are - MBMS - BCMCS | Defined by the wireless network operator | Delivery of in band video emergency alert message | Reception of in band video emergency alert message |
| Data Coding Scheme | Identification of the video codecs supported by the wireless operator selected in band video delivery technology | Defined by the in band video delivery technology selected by the wireless network operator | Passed thru to mobile device | Decoding of received in band video content for presentation to mobile device user. |
| Retransmission | Frequency of retransmission Retransmission parameters could including the following: - Time between retransmissions - Total number of retransmissions - Duration of retransmission interval | Defined by the wireless network operator based upon the selected in band video delivery technology | Perform video emergency alert message retransmissions via the wireless network operator selected in band video delivery technology, | Attribute not delivered to mobile device |
| Wireless Network to Mobile Handset Security | Definition of security functions between wireless operator network and mobile device to support the following: - Data Integrity - Non-Repudiation - Authentication | Defined by the wireless network operator based upon the selected in band video delivery technology | Perform security functions between wireless network and mobile device for the wireless network operator selected in band video delivery technology | Perform security functions between wireless network and mobile device for the wireless network operator selected in band video delivery technology |

| Out of band Video/Multimedia Attributes ||||| 
|---|---|---|---|---|
| Attribute Name | Attribute Definition | Attribute Source | Usage by Wireless Operator Network | Usage by Mobile Device |
| Size | Maximum number of bytes and/or maximum length in seconds supported by the out of band video/multimedia delivery technology | Defined by the out of band video/multimedia delivery technology selected by the wireless network operator | Outside of wireless operator network | Validation that the out of band video/multimedia emergency alert message content is within limitations of mobile device |
| Delivery Technologies | Identification of the wireless network operator selected out of band video/multimedia delivery technology Available delivery technologies are - DVB-H - MediaFLO | Defined by the wireless network operator | Outside of wireless operator network | Reception of out of band video/multimedia emergency alert message |
| Data Coding Scheme | Identification of the video codecs supported by the wireless operator selected out of band video delivery technology | Defined by the out of band video/multimedia delivery technology selected by the wireless network operator | Outside of wireless operator network | Decoding of received out of band video/multimedia content for presentation to mobile device user. |
| Retransmission | Frequency of retransmission Retransmission parameters could including the following: - Time between retransmissions - Total number of retransmissions - Duration of retransmission interval | Defined by the wireless network operator based upon the selected video delivery technology | Outside of wireless operator network | Attribute not delivered to mobile device |
| Out of band video/multimedia Network to Mobile Handset Security | Definition of security functions between out of band video/multimedia network and mobile device to support the following: - Data Integrity - Non-Repudiation - Authentication | Defined by the wireless network operator based upon the selected out of band video/multimedia delivery technology | Outside of wireless operator network | Perform security functions between out of band video/multimedia network and mobile device for the wireless network operator selected out of band video delivery technology |

| Multimedia Attributes | | | | |
|---|---|---|---|---|
| Attribute Name | Attribute Definition | Attribute Source | Usage by Wireless Operator Network | Usage by Mobile Device |
| Size | Maximum number of bytes supported by the multimedia delivery technology | Defined by the multimedia delivery technology selected by the wireless network operator | Validation that the multimedia emergency alert message content is within limitations of delivery technology | Validation that the multimedia emergency alert message content is within limitations of mobile device |
| Delivery Technologies | Identification of the wireless network operator selected multimedia delivery technology<br>Available delivery technologies are<br>- MBMS<br>- BCMCS | Defined by the wireless network operator | Delivery of multimedia emergency alert message | Reception of multimedia emergency alert message |
| Data Coding Scheme | Identification of the data coding schemes for wireless network operator selected multimedia delivery technology<br>Example include:<br>- JPEG<br>- MP3<br>- WAV<br>- RAM<br>- TIF<br>- BMP<br>- JAVA or JAVA Script | Defined by the multimedia delivery technology selected by the wireless network operator | Passed thru to mobile device | Decoding of received multimedia content for presentation to mobile device user. |
| Retransmission | Frequency of retransmission<br>Retransmission parameters could including the following:<br>- Time between retransmissions<br>- Total number of retransmissions<br>- Duration of retransmission interval | Defined by the wireless network operator based upon the selected multimedia delivery technology | Perform multimedia emergency alert message retransmissions via the wireless network operator selected multimedia delivery technology | Attribute not delivered to mobile device |
| Wireless Network to Mobile Handset Security | Definition of security functions between wireless operator network and mobile device to support the following:<br>- Data Integrity<br>- Non-Repudiation<br>- Authentication | Defined by the wireless network operator based upon the selected multimedia delivery technology | Perform security functions between wireless network and mobile device for the wireless network operator selected multimedia delivery technology | Perform security functions between wireless network and mobile device for the wireless network operator selected multimedia delivery technology |

EMERGENCY ALERT SYSTEM (EAS) MESSAGE SERVICE PROFILE

CROSS REFERENCE TO RELATED APPLICATIONS

The present application claims priority to U.S. Provisional Patent Application No. 60/889,425 entitled "EMERGENCY ALERT SYSTEM (EAS) MESSAGE SERVICE PROFILE," filed Feb. 12, 2007, which is hereby incorporated by reference in its entirety.

TECHNICAL FIELD

The technical field generally relates to communications systems and more specifically relates to the broadcast of Emergency Alert System (EAS) notifications and messages in accordance with an EAS protocol.

BACKGROUND

The Emergency Alert System (EAS) is capable of providing messages indicative of a variety of types of alerts. Via the EAS, subscribers thereof can receive messages pertaining to weather conditions, disasters, AMBER (America's Missing: Broadcast Emergency Response) alerts, and/or alerts issued by the Government, for example. Various delivery technologies are in place for delivering EAS messages. A problem however, is that not all delivery technologies may be compatible with all envisioned EAS message protocols or service profiles.

SUMMARY

The service profile of an emergency alert system (EAS) message is formatted to contain information pertaining to the alert and the technology utilizable to deliver the EAS message. In an example configuration, the service profile comprises an alert profile portion and a technology profile portion. The alert profile portion comprises information pertaining to alert attributes, such as, for example, a message ID, message status, message type, an associated message ID, the sender of the message, the creation time of the message, the expiration time of the message, an indication that the alert is a Presidential level alert, an indication of the wireless alert message category, an alert urgency, an alert severity, an alert certainty, the area associated with the alert, a general description of the alert, security functions associated with the message, or a combination thereof. The technology profile portion comprises information pertaining to technology utilizable to deliver the message, such as, for example, attributes pertaining to text, attributes pertaining to audio, attributes pertaining to in band video, attributes pertaining to out of band video/multimedia, multimedia attributes, or a combination thereof.

BRIEF DESCRIPTION OF THE DRAWINGS

The foregoing and other objects, aspects and advantages of an EAS message service profile will be better understood from the following detailed description with reference to the drawings.

FIG. 2, FIG. 3, and FIG. 4 depict example alert attributes of the alert attributes portion of the alert profile portion of the EAS message service profile.

FIG. 5 depicts example alert content attributes of the alert attributes portion of the alert profile portion of the EAS message service profile.

FIG. 6 depicts example text attributes of the technology profile portion of the EAS message service profile.

FIG. 7 depicts example audio attributes of the technology profiles portion of the EAS message service profile.

FIG. 8 depicts example in-band video attributes of the technology profiles portion of the EAS message service profile.

FIG. 9 depicts example out-of-band video/multimedia attributes of the technology profiles portion of the EAS message service profile.

FIG. 10 depicts example multimedia attributes of the technology profiles portion of the EAS message service profile.

DESCRIPTION OF ILLUSTRATIVE EMBODIMENTS

Subscribers of the Emergency Alert System (EAS) can receive messages pertaining to a variety of alerts. EAS messages are transmittable via broadcast technologies, such as, for example, Cell Broadcast, Multimedia Broadcast/Multicast Service ("MBMS"), and video broadcast, (e.g., Digital Video broadcast-Handheld ("DVB-H"), and MediaFLO), WiFi, WiMAX, NOAA (National Oceanic And Atmospheric Administration) Weather Radio, FM/AM radio, television, SMR (specialized mobile radio), satellite radio, satellite telephone service, and LMR (land mobile radio), or a combination thereof.

An EAS message service profile (protocol) defines the alert and technology attributes associated with the delivery of an EAS emergency alert message. The EAS message service profile is defined such that it is compatible with known delivery technologies. In an example embodiment, a protocol is defined in which support of text attributes is mandatory and support of other attributes is optional. Example optional attributes include audio attributes, video attributes, multimedia attributes. It is to be understood however, that the herein description of mandatory and optional attributes is exemplary and that should not be restricted thereto.

Figure 1:
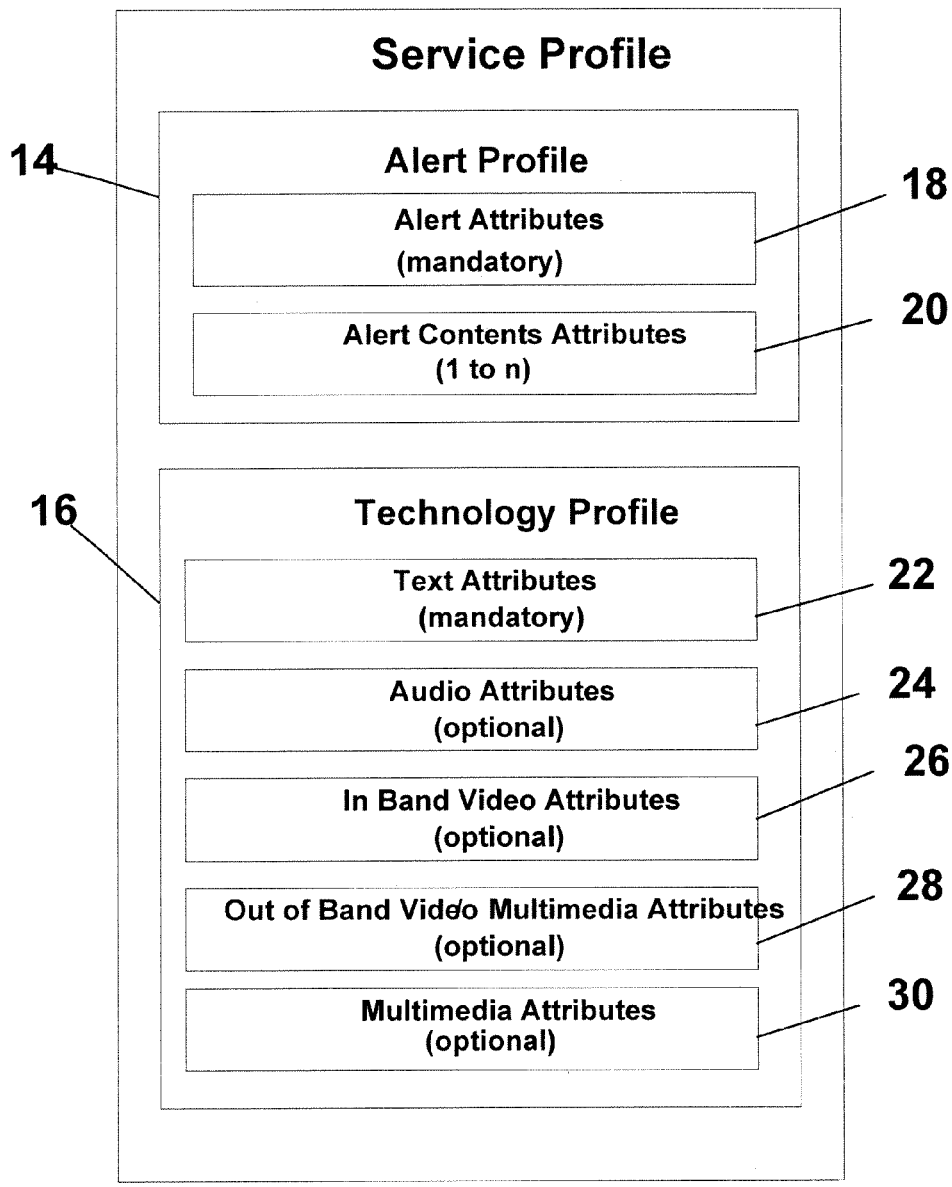
FIG. 1 depicts an example structure of an EAS message service profile.

FIG. 1 depicts an example structure 12 of an EAS message service profile. The EAS message service profile 12 comprises an alert profile portion 14 and a technology profile portion 16. The alert profile portion 14 comprises an alert attributes portion 18 and an alert contents attributes portion 20. The technology profile portion 16 comprises a text attributes portion 22, an audio attributes portion 24, an in-band video attributes portion 26, an out-of-band video/multimedia attributes portion 28, an a multimedia attributes portion 30. In an example configuration, the alert attributes portion 18 and the text attributes portion 22 are mandatory. And, the text attributes portion 22, the audio attributes portion 24, the in-band video attributes portion 26, the out-of-band video/multimedia attributes portion 28, and the multimedia attributes portion 30 are optional.

FIG. 2, FIG. 3, and FIG. 4 depict example alert attributes of the alert attributes portion 18 of the Alert Profile portion 14 of the EAS message service profile 12. The alert attributes provide general information about the EAS alert message. In an example embodiment, the alert attributes depicted in FIG. 2, FIG. 3, and FIG. 4, are a mandatory part of the alert attributes portion 18 of the Alert Profile portion 14 of the EAS message service profile 12. As shown in FIG. 2, FIG. 3, and FIG. 4, example alert attributes include a message ID, a message status, a message type, an associated message ID, and EAS sender, an alert creation timestamp, an alert expiration timestamp, a presidential alert indicator, a wireless alert message category, an alert urgency, an alert severity, an alert certainty, an alert area, alert information, a gateway to wireless network security, or a combination thereof.

FIG. 5 depicts example alert content attributes of the alert attributes portion 20 of the Alert Profile portion 14 of the EAS message service profile 12. The Alert Content Attributes provide the alert contents of the EAS emergency alert message. There can be one or more instances of the alert content based upon the alert content attributes. In an example embodiment, at least one instance of the alert content is mandatory and comprises a text based English language content in a format suitable for delivery to wireless mobile devices. As shown in FIG. 5, example alert content attributes include content format, content language, alert contents, or a combination thereof.

FIG. 6 depicts example text attributes 22 of the technology profile portion 16 of the EAS message service profile 12. In an example embodiment, the text attributes are a mandatory part of the technology profiles portion 16 of the service profile 12. The text attributes define the attributes associated with a text based wireless EAS emergency alert message. As shown in FIG. 6, example text attributes include size, delivery technologies, data coding scheme, retransmission, wireless network to mobile handset security, or a combination thereof.

FIG. 7 depicts example audio attributes 24 of the technology profiles portion 16 of the EAS message service profile 12. In an example embodiment, the audio attributes are an optional part of the technology profiles portion 16 of the EAS message service profile 12. The audio attributes 24 define the attributes associated with an audio based EAS emergency alert message. As shown in FIG. 7, example audio attributes 24 include size, delivery technologies, data coding scheme, retransmission, wireless network to mobile handset security, or a combination thereof.

FIG. 8 depicts example in-band video attributes 26 of the technology profiles portion 16 of the EAS message service profile 12. In an example embodiment, the in-band video attributes 26 are an optional part of the technology profiles portion 16 of the EAS message service profile 12. The in-band video attributes 26 define the attributes associated with a video based EAS emergency alert message that is broadcast over a wireless operator's network. As shown in FIG. 8, example in-band video attributes 264 include size, delivery technologies, data coding scheme, retransmission, wireless network to mobile handset security, or a combination thereof.

FIG. 9 depicts example out-of-band video/multimedia attributes 28 of the technology profiles portion 16 of the EAS message service profile 12. In an example embodiment, the out-of-band video/multimedia attributes 28 are an optional part of the technology profiles portion 16 of the EAS message service profile 12. The out-of-band video/multimedia attributes 28 define the attributes associated with a video based EAS emergency alert message that are broadcast to the mobile devices via frequencies outside the wireless operator's license. As shown in FIG. 9, example out-of-band video/multimedia attributes 28 include size, delivery technologies, data coding scheme, retransmission, out-of-band video/multimedia network to mobile handset security, or a combination thereof.

FIG. 10 depicts example multimedia attributes 30 of the technology profiles portion 16 of the EAS message service profile 12. In an example embodiment, the multimedia attributes 30 are an optional part of the technology profiles portion 16 of the EAS message service profile 12. The multimedia attributes 30 define the attributes associated with a multimedia EAS emergency alert message such as still pictures, graphics, audio clips, video clips, maps, and the like. As shown in FIG. 10, example multimedia attributes 30 include size, delivery technologies, data coding scheme, retransmission, wireless network to mobile handset security, or a combination thereof.

Figure 11:
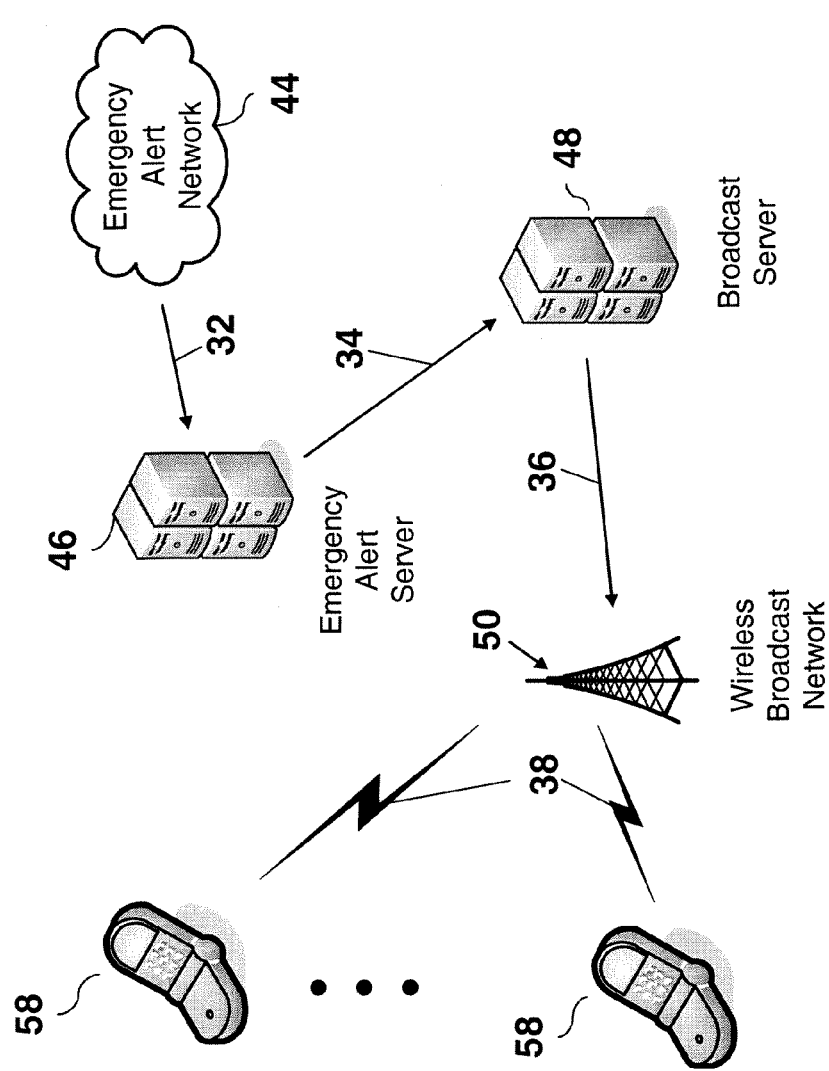
FIG. 11 is a flow diagram of an example process and system for broadcasting an EAS emergency alert message formatted in accordance with the EAS message service profile.

FIG. 11 is a flow diagram of an example process and system for broadcasting an EAS messages formatted in accordance with the EAS message service profile 12. At step 32, the emergency alert network 44 provides to the emergency alert server 46 an emergency alert message. The emergency alert server 46 evaluates the received emergency alert message and accordingly generates an EAS emergency alert message. In an example embodiment, the emergency alert server 46 provides the EAS emergency alert message formatted in accordance with the EAS profile service 12.

At step 34, the emergency alert server 46 provides to a broadcast server 48 the enhanced EAS emergency alert message formatted in accordance with the EAS profile service 12. The broadcast server 48, at step 36, provides to the wireless broadcast network 50 the enhanced emergency alert message formatted in accordance with the EAS profile service 12.

The wireless broadcast network 50, at step 38, broadcasts the EAS emergency alert message to the mobile device 58. The wireless broadcast network 50 can utilize any appropriate broadcast technology to broadcast the EAS emergency alert message. Appropriate broadcast technologies include, for example, Cell Broadcast, Multimedia Broadcast/Multicast Service ("MBMS"), and video broadcast, (e.g., Digital Video broadcast-Handheld ("DVB-H"), and MediaFLO), WiFi, WiMAX, NOAA (National Oceanic And Atmospheric Administration) Weather Radio, FM/AM radio, television, SMR (specialized mobile radio), satellite radio, satellite telephone service, and LMR (land mobile radio), or a combination thereof.

The mobile device 58 processes the EAS emergency alert message and renders an indication of the emergency alert accordingly. Rendering an indication of the EAS emergency alert can be accomplished in appropriate manner, such as an audible alert via a transducer of the mobile device 58, a visual alert on a display of the mobile device 58, and/or a mechanical (e.g., vibration) alert via the mobile device 58. Rendering an alert message can be accomplished in appropriate manner, such as an audible alert message via a transducer of the mobile device 58 and/or a visual alert message on a display of the mobile device 58.

The mobile device 58 is representative of any appropriate type of device that can be utilized to receive a broadcast message. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television).

The mobile device 58 can comprise any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

Each of the emergency alert server 46, the broadcast server 48 and the mobile device 58 can comprise any appropriate type of processor. Example processors can be implemented in a single processor or multiple processors. Multiple processors can be distributed or centrally located. Multiple processors can communicate wirelessly, via hard wire, or a combination thereof. Examples processors include mobile communications devices, mobile telephones, personal digital assistants (PDAs), lap top computers, handheld processors, or a combination thereof.

The following description sets forth some exemplary telephony radio networks and non-limiting operating environments for broadcasting EAS emergency alert messages formatted in accordance with the EAS message service profile 12. The below-described operating environments should be considered non-exhaustive, however, and thus the below-described network architectures merely show how selectable processing of broadcast messages may be incorporated into existing network structures and architectures. It can be appreciated, however, that the EAS message service profile can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of selectable processing of broadcast messages can be applied independently of the method for data transport, and do not depend on any particular network architecture, or underlying protocols.

Figure 12:
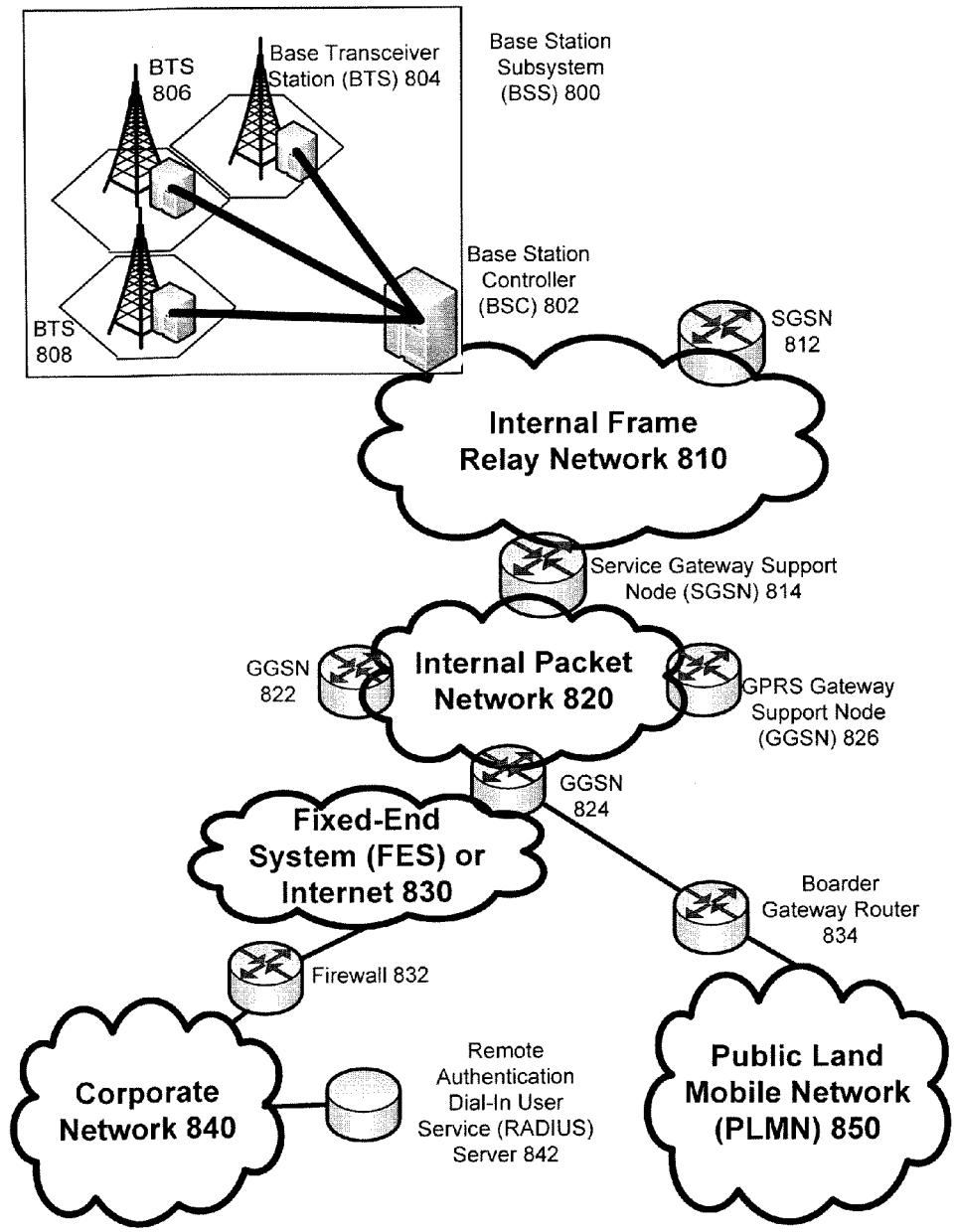
FIG. 12 depicts an overall block diagram of an exemplary packet-based mobile cellular network environment, such as a GPRS network, in which the system for providing an EAS emergency alert message formatted in accordance with the EAS message service profile can be practiced.

FIG. 12 depicts an overall block diagram of an exemplary packet-based mobile cellular network environment, such as a GPRS network, in which the system for broadcasting EAS emergency alert messages formatted in accordance with the EAS message service profile 12 can be practiced. In an example configuration, the emergency alert network 44 and/or the wireless broadcast network 30 are encompassed by the network environment depicted in FIG. 12. In such an environment, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices (e.g., portable device 38) become connected to the wireless network. In exemplary fashion, the packet traffic originating from user devices (e.g., user device 80) is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 13:
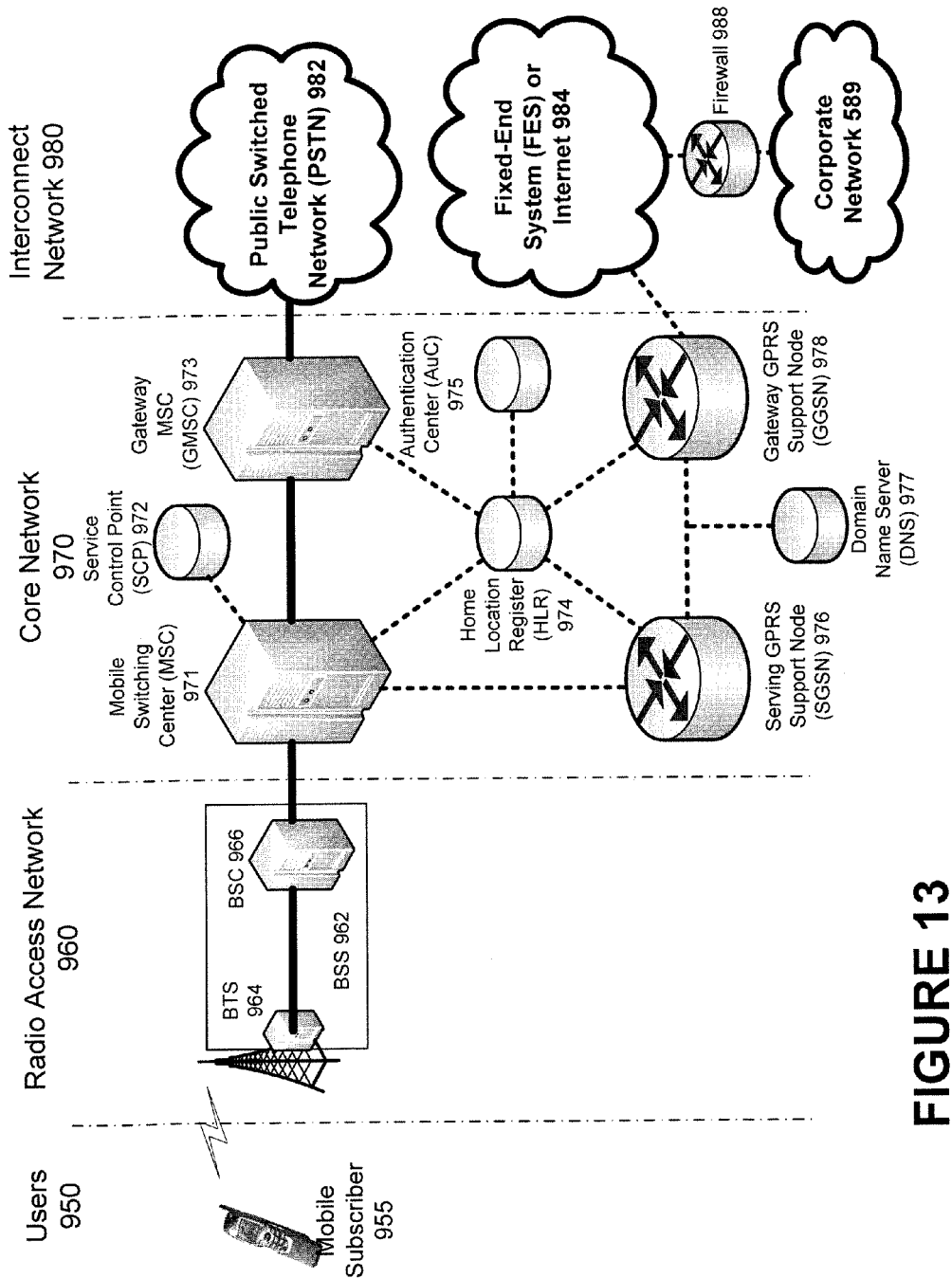
FIG. 13 illustrates an architecture of a typical GPRS network as segmented into four groups.

FIG. 13 illustrates an architecture of a typical GPRS network as segmented into four groups: users 950, radio access network 960, core network 970, and interconnect network 980. In an example configuration the emergency alert network 44, and the wireless broadcast network 50 are encompassed by the radio access network 960, core network 970, and interconnect network 980. Users 950 comprise a plurality of end users (though only mobile subscriber 955 is shown in FIG. 13). In an example embodiment, the device depicted as mobile subscriber 955 comprises portable device 58. Radio access network 960 comprises a plurality of base station subsystems such as BSSs 962, which include BTSs 964 and BSCs 966. Core network 970 comprises a host of various network elements. As illustrated here, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 9, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the portable device 58, used by an end user of the mobile cellular service. When a mobile subscriber turns on his or her mobile device, the mobile device goes through an attach process by which the mobile device attaches to an SGSN of the GPRS network. In FIG. 13, when mobile subscriber 955 initiates the attach process by turning on the network capabilities of the mobile device, an attach request is sent by mobile subscriber 955 to SGSN 976. The SGSN 976 queries another SGSN, to which mobile subscriber 955 was attached before, for the identity of mobile subscriber 955. Upon receiving the identity of mobile subscriber 955 from the other SGSN, SGSN 976 requests more information from mobile subscriber 955. This information is used to authenticate mobile subscriber 955 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 955 was attached before, to cancel the location process for mobile subscriber 955. HLR 974 then notifies SGSN 976 that the location update has been performed. At this time, SGSN 976 sends an Attach Accept message to mobile subscriber 955, which in turn sends an Attach Complete message to SGSN 976.

After attaching itself with the network, mobile subscriber 955 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 955. The mobile subscriber 955 uses an algorithm to send the user identification (ID) and password to SGSN 976. The SGSN 976 uses the same algorithm and compares the result. If a match occurs, SGSN 976 authenticates mobile subscriber 955.

Next, the mobile subscriber 955 establishes a user session with the destination network, corporate network 989, by going through a Packet Data Protocol ("PDP") activation process. Briefly, in the process, mobile subscriber 955 requests access to the Access Point Name ("APN"), for example, UPS.com (e.g., which can be corporate network 989 in FIG. 9) and SGSN 976 receives the activation request from mobile subscriber 955. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 955.

Once activated, data packets of the call made by mobile subscriber 955 can then go through radio access network 960, core network 970, and interconnect network 980, in a particular fixed-end system or Internet 984 and firewall 988, to reach corporate network 989.

Thus, network elements that can invoke the functionality of selectively processing and EAS message can include but are not limited to Gateway GPRS Support Node tables, Fixed End System router tables, firewall systems, VPN tunnels, and any number of other network elements as required by the particular digital network.

Figure 14:
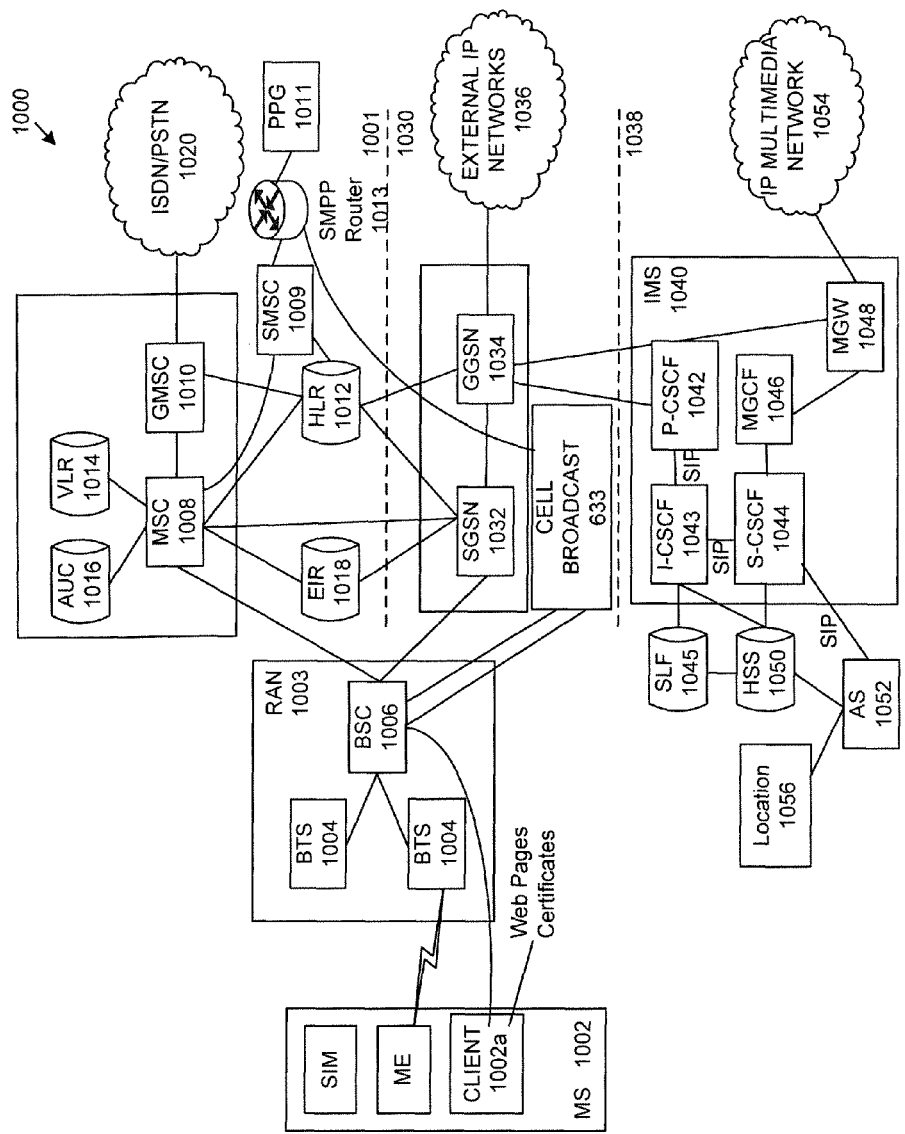
FIG. 14 illustrates an example alternate block diagram of an exemplary GSM/GPRS/IP multimedia network architecture in which broadcast of an EAS emergency alert message formatted in accordance with the EAS message service profile can be accomplished.

FIG. 14 illustrates another exemplary block diagram view of a GSM/GPRS/IP multimedia network architecture 1000 in which broadcast of an EAS emergency alert message formatted in accordance with the EAS message service profile 12 can be incorporated. As illustrated, architecture 1000 of FIG. 14 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer (e.g., portable device 38) that is used by mobile subscribers, with a Subscriber identity Module (SIM). The SIM includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF.

The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments an EAS message service profile have been described in connection with various computing devices, the underlying concepts can be applied to any computing device or system capable of selectively processing a broadcast message. The various techniques described herein can be implemented in connection with hardware or software or, where appropriate, with a combination of both. Thus, the methods and apparatus for broadcasting an EAS emergency alert message formatted in accordance with an EAS message service profile, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing an EAS message service profile. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for broadcasting an EAS emergency alert message formatted in accordance with an EAS message service profile also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for broadcasting an EAS emergency alert message formatted in accordance with an EAS message service profile. When implemented on a general-purpose processor, the program code combines with the processor to provide a unique apparatus that operates to invoke the functionality of an EAS message service profile. Additionally, any storage techniques used in connection with an EAS message service profile can invariably be a combination of hardware and software.

While the EAS message service profile has been described in connection with the various embodiments of the various figures, it is to be understood that other similar embodiments can be used or modifications and additions can be made to the described embodiment for performing the same function of the EAS message service profile without deviating therefrom. For example, one skilled in the art will recognize that a system for broadcasting an EAS emergency alert message formatted in accordance with an EAS message service profile as described above may apply to any environment, whether wired or wireless, and may be applied to any number of devices connected via a communications network and interacting across the network. Therefore, broadcasting an EAS emergency alert message formatted in accordance with an EAS message service profile should not be limited to any single embodiment, but rather should be construed in breadth and scope in accordance with the appended claims.

What is claimed is:

1. A method comprising:
   generating, by a processor, an emergency alert message, the emergency alert message comprising:
   an alert profile portion indicative of alert type information, the alert profile portion comprising:
   a message identification attribute comprising a unique message identifier;
   a message status attribute indicating a status of the message comprising at least one of exercise, system, or test;
   a message type attribute indicating a type of alert message comprising at least one of alert, update, cancel, error, and acknowledgement;
   an associated message identification attribute comprising an identifier of a previous associated message alert;
   an emergency alert system (EAS) sender attribute indicating a sender of the message;
   an alert creation timestamp attribute indicating a time of generation of the message;
   an alert expiration timestamp attribute indicating a time of expiration of the message;
   a presidential alert indicator attribute indicating whether the message is a Presidential level alert message;
   a wireless alert message category attribute comprising an associated wireless alert message category;
   an alert urgency attribute indicating an urgency of the alert message comprising at least one of immediate or expected;
   an alert severity attribute indicating a severity of the alert message comprising at least one of extreme or severe;
   an alert certainty attribute indicating a certainty of the alert message comprising at least one of observed or likely;

an alert area attribute indicating an emergency alert area;

the alert information attribute comprising a description of the emergency alert; and a gateway to wireless network security attribute indicating a security function between an EAS gateway and a wireless operator network; and a technology profile portion indicative of information relating to a technology for providing the emergency alert message, the technology profile portion comprising a text attribute portion, an audio attribute portion, an in-band video attribute portion, an out-of-band video/multimedia attribute portion, and a multimedia attribute portion.

2. The method of claim 1, wherein the alert profile portion further comprises at least one of an alert attributes portion or an alert contents attributes portion.

3. The method of claim 2, wherein the alert contents attributes portion comprises at least one of a content format attribute, a content language attribute, or an alert contents attribute.

4. The method of claim 3 wherein:

the content format attribute is indicative of a format of the message content comprising at least one of text, audio, video, or multimedia;

the content language attribute is indicative of a language of the emergency alert message; and the alert contents attribute is indicative of a size and format of the emergency alert message content.

5. The method of claim 1, wherein the text attribute portion comprises at least one of a size attribute, a delivery technology attribute, a data coding scheme attribute, a retransmission attribute, or a wireless network to mobile handset security attribute.

6. The method of claim 5, wherein:

the size attribute is indicative of a size of the emergency alert message comprising at least one of a maximum number of bytes, a maximum number of segments, and a segment length;

the delivery technology attribute is indicative of a size of a delivery technology for providing the message comprising at least one of a cellular broadcast technology, a multimedia broadcast multicast service technology, a broadcast and multicast services technology, and a paging technology;

the data coding scheme attribute is indicative of a text coding scheme;

the retransmission attribute is indicative of a size of retransmission parameters comprising at least one of frequency, time between retransmissions, total number of retransmissions, and duration of a transmission interval; and the wireless network to mobile handset security attribute is indicative of at least one of a size and a type of a security function between an EAS gateway and a wireless operator network.

7. The method of claim 1, wherein the audio attribute portion comprises at least one of a size attribute, a delivery technology attribute, a data coding scheme attribute, a retransmission attribute, or a wireless network to mobile handset security attribute.

8. The method of claim 7, wherein:

the size attribute is indicative of a size of the emergency alert message comprising at least one of a maximum number of bytes and a maximum length of time;

the delivery technology attribute is indicative of a size of a delivery technology for providing the message comprising at least one of a cellular broadcast technology, a multimedia broadcast multicast service technology, a broadcast and multicast services technology, a Digital Video broadcast-Handheld technology, a MediaFLO, and a National Oceanic And Atmospheric Administration Weather Radio technology;

the data coding scheme attribute is indicative of an audio coding scheme;

the retransmission attribute is indicative of a size of retransmission parameters comprising at least one of frequency, time between retransmissions, total number of retransmissions, and duration of a transmission interval; and the wireless network to mobile handset security attribute is indicative of at least one of a size and a type of a security function between an emergency alert system gateway and a wireless operator network.

9. The method of claim 1, wherein the in-band video attribute portion comprises at least one of a size attribute, a delivery technology attribute, a data coding scheme attribute, a retransmission attribute, or a wireless network to mobile handset security attribute.

10. The method of claim 9, wherein:

the size attribute is indicative of a size of the emergency alert message comprising at least one of a maximum number of bytes and a maximum length of time;

the delivery technology attribute is indicative of a size of a delivery technology for providing the message comprising at least one of a cellular broadcast technology, a multimedia broadcast multicast service (MBMS) technology and a broadcast and multicast services (BCMCS) technology;

the data coding scheme attribute is indicative of a video coding scheme;

the retransmission attribute is indicative of a size of retransmission parameters comprising at least one of frequency, time between retransmissions, total number of retransmissions, and duration of a transmission interval; and the wireless network to mobile handset security attribute is indicative of at least one of a size and a type of a security function between an EAS gateway and a wireless operator network.

11. The method of claim 1, wherein the out-of-band video/multimedia attribute portion comprises at least one of a size attribute, a delivery technology attribute, a data coding scheme attribute, a retransmission attribute, or an out-of-band video/multimedia wireless network to mobile handset security attribute.

12. The method of claim 11, wherein:

the size attribute is indicative of a size of the message comprising at least one of a maximum number of bytes and a maximum length of time;

the delivery technology attribute is indicative of a size of a delivery technology for providing the message comprising at least one of a cellular broadcast technology, a multimedia broadcast multicast service (MBMS) technology, a broadcast and a MediaFLO technology;

the data coding scheme attribute is indicative of a video coding scheme;

the retransmission attribute is indicative of a size of retransmission parameters comprising at least one of frequency, time between retransmissions, total number of retransmissions, and duration of a transmission interval; and the wireless network to mobile handset security attribute is indicative of at least one of a size and a type of a security function between an EAS gateway and a wireless operator network.

13. The method of claim 1, wherein the multimedia attribute portion comprises at least one of a size attribute, a delivery technology attribute, a data coding scheme attribute, a retransmission attribute, and a wireless network to mobile handset security attribute.

14. The method of claim 13, wherein:
the size attribute is indicative of a size of the emergency alert message comprising a maximum number of bytes;
the delivery technology attribute is indicative of a size of a delivery technology for providing the message comprising at least one of a cellular broadcast technology, a multimedia broadcast multicast service (MBMS) technology and a broadcast and multicast services (BCMCS) technology;
the data coding scheme attribute is indicative of a data coding scheme;
the retransmission attribute is indicative of a size of retransmission parameters comprising at least one of frequency, time between retransmissions, total number of retransmissions, and duration of a transmission interval; and
the wireless network to mobile handset security attribute is indicative of at least one of a size and a type of a security function between an EAS gateway and a wireless operator network.

15. A device comprising:
a processor; and
memory coupled to the processor, the memory comprising executable instructions that when executed by the processor cause the processor to effectuate operations comprising:
generating an emergency alert message, the emergency alert message comprising:
an alert profile portion comprising:
a message identification attribute comprising a unique message identifier;
a message status attribute indicating a status of the message comprising at least one of exercise, system, or test;
a message type attribute indicating a type of alert message comprising at least one of alert, update, cancel, error, and acknowledgement;
an associated message identification attribute comprising an identifier of a previous associated message alert;
an emergency alert system (EAS) sender attribute indicating a sender of the message;
an alert creation timestamp attribute indicating a time of generation of the message;
an alert expiration timestamp attribute indicating a time of expiration of the message;
a presidential alert indicator attribute indicating whether the message is a Presidential level alert message;
a wireless alert message category attribute comprising an associated wireless alert message category;
an alert urgency attribute indicating an urgency of the alert message comprising at least one of immediate or expected;
an alert severity attribute indicating a severity of the alert message comprising at least one of extreme or severe;
an alert certainty attribute indicating a certainty of the alert message comprising at least one of observed or likely;
an alert area attribute indicating an emergency alert area;
the alert information attribute comprising a description of the emergency alert; and
a gateway to wireless network security attribute indicating a security function between an EAS gateway and a wireless operator network; and
a technology profile portion comprising a text attribute portion, an audio attribute portion, an in-band video attribute portion, an out-of-band video/multimedia attribute portion, and a multimedia attribute portion.

16. The device of claim 15, wherein the device comprises a mobile device.

17. The device of claim 16, the operations further comprising rendering an indication of the received emergency alert message, wherein the indication of the emergency alert message is at least one of visually rendered, audibly rendered, or mechanically rendered, via the mobile device.

18. A computer readable medium that is not a signal, the computer readable medium comprising executable instructions that when executed by a processor cause the processor to effectuate operations comprising:
generating an emergency alert message, the emergency alert message comprising:
an alert profile portion comprising:
a message identification attribute comprising a unique message identifier;
a message status attribute indicating a status of the message comprising at least one of exercise, system, or test;
a message type attribute indicating a type of alert message comprising at least one of alert, update, cancel, error, and acknowledgement;
an associated message identification attribute comprising an identifier of a previous associated message alert;
an emergency alert system (EAS) sender attribute indicating a sender of the message;
an alert creation timestamp attribute indicating a time of generation of the message;
an alert expiration timestamp attribute indicating a time of expiration of the message;
a presidential alert indicator attribute indicating whether the message is a Presidential level alert message;
a wireless alert message category attribute comprising an associated wireless alert message category;
an alert urgency attribute indicating an urgency of the alert message comprising at least one of immediate or expected;
an alert severity attribute indicating a severity of the alert message comprising at least one of extreme or severe;
an alert certainty attribute indicating a certainty of the alert message comprising at least one of observed or likely;
an alert area attribute indicating an emergency alert area;
the alert information attribute comprising a description of the emergency alert; and
a gateway to wireless network security attribute indicating a security function between an EAS gateway and a wireless operator network; and a technology profile portion comprising a text attribute portion, an audio attribute portion, an in-band video attribute portion, an out-of-band video/multimedia attribute portion, and a multimedia attribute portion.

* * * * *